United States Patent [19]

Kani

[11] Patent Number: 4,777,193

[45] Date of Patent: Oct. 11, 1988

[54] MOLDED RESIN COMPOSITION OF FRICTIONAL MATERIAL FOR USE IN CLUTCHES

[75] Inventor: Harunobu Kani, Toyota, Japan

[73] Assignee: Toyota Jidosha Kabushiki Kaisha, Toyota, Japan

[21] Appl. No.: 87,405

[22] Filed: Aug. 20, 1987

[30] Foreign Application Priority Data

Aug. 29, 1986 [JP]  Japan .................... 61-204655

[51] Int. Cl.$^4$ ............................ C08K 7/02; C08K 3/34
[52] U.S. Cl. .................................... 523/153; 523/155; 523/156
[58] Field of Search .................. 523/153, 155, 156

[56] References Cited

U.S. PATENT DOCUMENTS

| | | | |
|---|---|---|---|
| 3,967,037 | 6/1976 | Marzocchi et al. | 524/445 |
| 4,130,537 | 12/1978 | Bohrer | 523/156 |
| 4,262,788 | 4/1981 | Yamamoto et al. | 523/153 |
| 4,364,879 | 12/1982 | Gut et al. | 264/22 |
| 4,403,047 | 9/1983 | Albertson | 523/153 |
| 4,465,796 | 8/1984 | Leroy et al. | 523/153 |
| 4,476,256 | 10/1984 | Hamermesh | 523/152 |
| 4,508,855 | 4/1985 | Peters | 523/153 |
| 4,617,162 | 10/1986 | von Rex et al. | 524/153 |

FOREIGN PATENT DOCUMENTS 983432  2/1965  United Kingdom .

*Primary Examiner*—Lewis T. Jacobs
*Attorney, Agent, or Firm*—Oblon, Fisher, Spivak, McClelland & Maier

[57] ABSTRACT

A molded resin composition of frictional material for use in clutches of automobiles or the like, comprising inorganic fiber, a resin binder, an inorganic filler and an organic filler, wherein the inorganic filler contains zirconium silicate in an amount from 0.1 to 5.0% by volume based on 100% by volume of the total composition. This composition of frictional material enables the production of clutches having excellent balanced properties between the improvement of $\mu$ (friction coefficient) and anti-wearing properties.

9 Claims, 1 Drawing Sheet ved, $\mu$ tends to be decreased when the anti-wearing

MOLDED RESIN COMPOSITION OF FRICTIONAL MATERIAL FOR USE IN CLUTCHES

BACKGROUND OF THE INVENTION

1. Field of the Invention

This invention concerns a molded resin composition of frictional material for use in clutches of automobiles or the like.

2. Discussion of the Background

Known conventional resin molded type compositions of frictional material for use in clutches are compositions containing inorganic fibers such as asbestos, glass fibers and the like, an inorganic filler such as barium sulfate, graphite and the like, metals such as copper and brass, and a binder such as melamine resin, phenolic resin, etc. This composition is produced by dry blending without using organic solvent, and then heated under pressure and treated with heat after preliminary molding at room temperature.

Generally, a $\mu$ (friction coefficient) improver and an anti-wearing property improver are contained in the inorganic filler. As the $\mu$ improver, a hard inorganic substance such as alumina, silica, magnesia and the like can be used; and as the anti-wearing property improver, graphite, molybdenum disulfide, lead sulfide and the like can be used.

These two improvers have properties contrary to each other, therefore the anti-wearing property tends to deteriorate when $\mu$ is increased, while on the other hand, $\mu$ tends to be decreased when the anti-wearing property is improved.

The balance of both improvers is adjusted in accordance with the kind and grain size of an addition agent, however sufficient friction properties can not be obtained with present technology.

SUMMARY OF THE INVENTION

Accordingly, the object of the invention is to eliminate the defects noted above and to provide a molded resin composition of frictional material for use in clutches exhibiting excellent balance between the improvement of $\mu$ and anti-wearing properties.

These and other objections of the invention which will become apparent from the following specification have been achieved by the present molded resin composition of a frictional material for use in a clutch, which comprises inorganic fibers, a resin binder, an inorganic filler and an organic filler, wherein said inorganic filler comprises zirconium silicate in an amount from 0.1–5.0% by volume based on 100% by volume of the total composition of the frictional material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
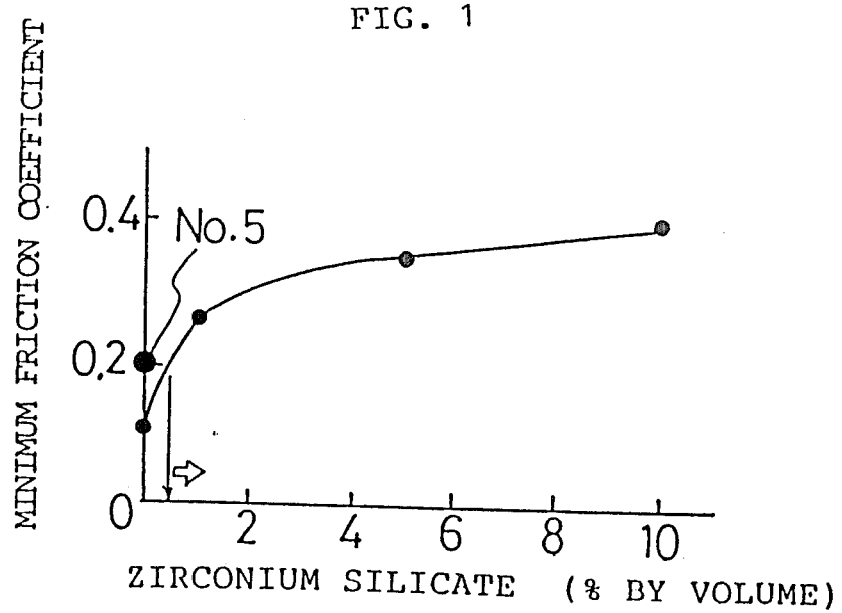
FIG. 1 is a graph showing the relationship between the blending ratio of zirconium silicate and the lowest friction coefficient in the frictional materials produced in the test example.

A molded resin composition of frictional material for use in clutches according to this invention comprises at least, inorganic type fibers, a resin type binder, an inorganic filler and an organic filler. A critical feature of the molded resin composition of frictional material for use in clutches is that the inorganic filler contains zirconium silicate at from 0.1 to 5.0% by volume based on 100% by volume of the total composition.

As inorganic type fibers, one or more kinds of fibers such as glass fibers, ceramic fibers, silica fibers, alumina fibers, carbon fibers, rock wool fibers and metallic fibers can be used as in the conventional way. The rock wool fibers are amorphous artificial inorganic fibers shaped into thin fibers by melting several kinds of ores with high heat and blasting off those melted ores with centrifugal force and compressed air.

Organic type fibers are also present in the composition of frictional material. As. organic fibers, fibers with heat-resistance are preferred, for example, one or more kinds of fibers such as aromatic polyamide fibers, polyimide fibers, polyamideimide fibers, phenolic fibers can be used. The blending ratio of matrix fibers can be fixed in accordance with the kind of frictional material to be manufactured.

As the resin binder, a phenolic resin or melamine resin can be used, however the phenolic resin binder is generally preferred.

By "phenolic resin binder" is meant those binders mainly composed of resins prepared through condensation of one or more types of phenols, such as phenol and cresol, with formaldehyde or a formaldehyde-forming compound. Modified phenolic resins which are modified with cashew nut oil, polyvinyl butyral, vegetable oil, melamine or epoxy compounds may be used. However, straight phenolic resins are preferred since they result in less fading.

The blending ratio of the phenolic resin binder is preferably from 15 to 25% by weight. The strength of the material is insufficient if the blending ratio is less than 15% by weight and, on the other hand, the necessary porosity cannot be ensured and the antifading property is made worse if the blending ratio exceeds 25% by weight.

An inorganic filler and an organic filler are present in the composition of the present invention, and it is a particular feature of this invention that the inorganic filler contains zirconium silicate at from 0.1 to 5.0% by volume based on 100% by volume of the total composition of frictional material.

A blending ratio of zirconium silicate less than 0.1% by volume is not preferable since the minimum friction coefficient is lowered. On the other hand, if the blending ratio is not less than 0.3% by volume, it is possible to provide excellent materials which minimum friction coefficients as high as conventional materials containing alumina. However, if the blending ratio exceeds 5.0% by volume, the cubical wearing ratio rises which is not preferable.

As the organic filler and the inorganic filler other than the zirconium silicate, a friction conditioner such as graphite, molybdenum disulfide, lead sulfide, antimony trisulfide and the like, organic dust such as cashew dust and the like, metal powder such as copper, brass and the like, and an inorganic filler such as barium sulfate, magnesium oxide, zirconium oxide, cryolite and the like can be used.

It is preferable that solid lubricants such as graphite, molybdenum disulfide, lead sulfide and the like, and metals such as copper, brass, aluminium and the like are also contained in the composition of frictional material of this invention. Here, metals have the function of decreasing the temperature of friction surfaces at high temperature.

For the method of manufacturing a clutch using the molded resin composition according to this invention, a conventional manufacturing method referred to as a molding method can be applied. That is, matrix fibers, a phenolic resin type powdery binder and organic and inorganic fillers and the like are sufficiently mixed and then subjected to preliminary molding under pressure at room temperature within a press mold. The preliminary molded product is then molded and heated in a hot press die.

Other features of the invention will become apparent in the course of the following descriptions of exemplary embodiments which are given for illustration of the invention and are not intended to be limiting thereof.

EXAMPLES

In these test examples, five types of compositions from No. 1 to No. 5 shown in the following table were first prepared. Numbers in the table are given in percentage by volume.

TABLE

| | matrix fibers | | | inorganic filler | | |
|---|---|---|---|---|---|---|
| No. | glass fibers | aromatic amide | phenolic resin | barium sulfate | zirconium silicate | alumina |
| 1 | 20 | 30 | 34 | 16 | 0 | — |
| 2 | 20 | 30 | 34 | 15 | 1 | — |
| 3 | 20 | 30 | 34 | 11 | 5 | — |
| 4 | 20 | 30 | 34 | 6 | 10 | — |
| 5 | 20 | 30 | 34 | 15 | — | 1 |

Glass fibers of approximately 3 mm length and 9 μm diameter were used. Kevlar ® fibers, partially ground into the shape of a pulp were used as the aromatic polyamide fibers. Straight phenolic resin powder was used as phenolic resin. Example No. 5 is a conventional composition containing alumina which is used conventionally. Also, Example No. 1, which does not contain zirconium silicate, is a composition prepared as comparative sample.

The frictional materials for clutches were blended at each composition according to the ratios shown in the Table and mixed for 10 minutes in a V-mixer. Thus obtained mixtures were charged in a die and subjected to preliminary molding at room temperature while applying pressure of 300 kg/cm$^2$ for one minute. Then, the preliminary molded products were subjected to hot pressing at 160° C. and under a pressure of 150 kg/cm$^2$ for 10 minutes, released from the die and then heated at 200° C. for 4 hours.

Each friction property (the minimum friction coefficient and cubical wearing ratio) of the thus obtained materials for clutches was examined by a clutch dynamometer. The conditions for this examination were as follows:

clutch size: 236φ×150φ×3.5
clutch cover load: 400 kg
temperature: 300° C. (about 50 times of clutching were needed for a temperature increase from room temperature to 300° C.)
inertia: 0.4 kgms$^2$
revolution: 2500 rpm
number of clutching: 200 times The minimum friction coefficient and cubical wearing ratio were obtained by the clutch dynamometer.

Figure 2:
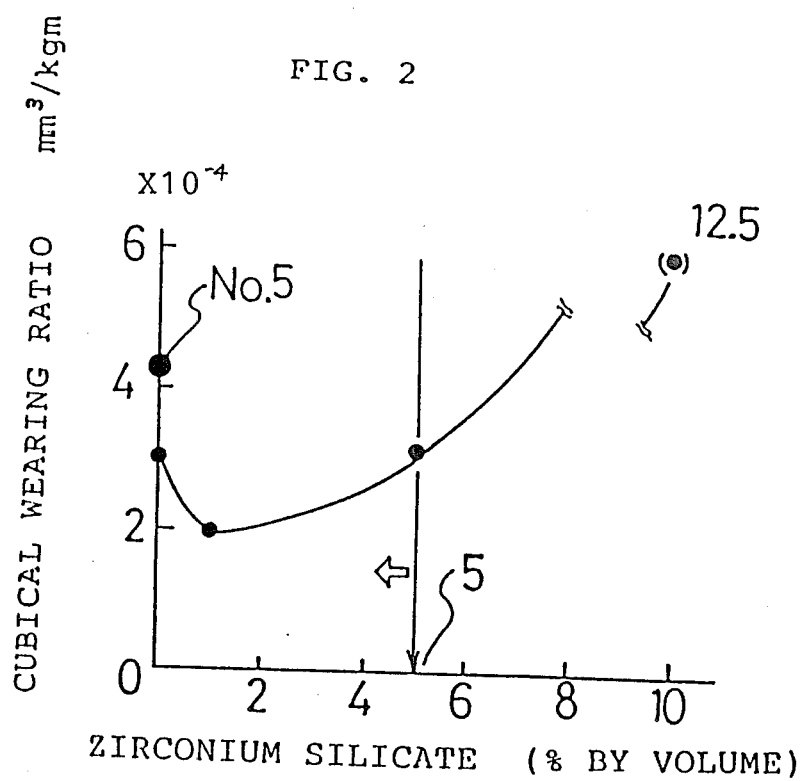
FIG. 2 is a graph showing the relationship between the blending ratio of zirconium silicate and the cubical wearing ratio in the frictional materials produced in the test example.

These results are collectively shown in FIGS. 1 and 2. As shown in FIG. 1, the minimum friction coefficient was not less than 0.15 in each case where the zirconium silicate was present in not less than 0.1% by volume. It was confirmed that the zirconium silicate of not less than 0.3% by volume was needed for ensuring the minimum friction coefficient of not less than 0.20 as shown in the conventional composition of Example No. 5.

Also, as shown in FIG. 2, a zirconium silicate content of not more than 5% by volume was needed to ensure the equal or less cubical wearing ratio relative to the comparative sample No. 1 (no zirconium silicate).

In this manner, if the zirconium silicate is within the range of from 0.3 to 5.0% by volume, the minimum friction coefficient $\mu$ is improved remarkably and an excellent result is obtained. Also, a frictional material with a low possibility of frictional damage to an opposing material and excellent balanced friction properties can be provided.

In the molded resin composition of frictional material for use in clutches according to this invention, which contains, at least inorganic type fibers, a resin type binder, an inorganic filler and organic filler, the essential feature of the molded resin composition of frictional material for use in clutches is that the inorganic filler contains zirconium silicate in an amount of 0.1 to 5.0% by volume based on 100% by volume of the total composition of frictional material. In this composition, a predetermined amount of zirconium silicate is present, so that an excellent balance can be ensured between the improvement of $\mu$ and the friction property with a low possibility of damage to an opposing material.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A molded resin composition of a frictional material for use in a clutch, consisting essentially of inorganic fiber, a resin binder selected from the group consisting of phenolic resins and melamine resins, an inorganic filler and an organic filler, wherein said inorganic filler comprises zirconium silicate in an amount from 0.1–5.0% by volume based on 100% by volume of the total composition of the frictional material.

2. The composition of claim 1, wherein said inorganic filler comprises from 0.3–5.0% by volume of zirconium silicate based on 100% by volume of the total composition of said frictional material.

3. The composition of claim 1, wherein said inorganic fiber comprises at least one member selected from the group consisting of glass fibers, ceramic fibers, silica fibers, alumina fibers, carbon fibers, rock wool fibers, and metallic fibers.

4. The composition of claim 1, wherein said resin binder is a phenolic resin binder.

5. The composition of claim 1, wherein said resin binder is present in an amount from 15-25% by weight.

6. The composition of claim 1, wherein said inorganic filler is at least one member selected from the group consisting of graphite, molybdenum disulfide, lead sulfide, antimony trisulfide, metal powders, barium sulfate, magnesium oxide, zirconium oxide, and cryolite.

7. A molded resin composition of a frictional material for use in a clutch, consisting essentially of inorganic fiber, organic fiber, a resin binder selected from the group consisting of phenolic resins and melamine resins, an inorganic filler and an organic filler, wherein said inorganic filler comprises zirconium silicate in an amount from 0.1-5.0% volume based on 100% by volume of the total composition of the frictional material.

8. The composition of claim 7, wherein said organic fiber is at least one member selected from the group consisting of aromatic polyamide fibers, polyimide, polyamideimide fibers, and phenolic fibers.

9. The composition of claim 7, wherein said organic fiber is selected from the group consisting of aromatic polyamide fibers, polyimide fibers and polyamideimide fibers.

* * * * *